Aug. 29, 1939.   W. J. BRETH ET AL   2,171,424
APPARATUS FOR EXPANDING A TIRE CARCASS AND INSERTING AN AIR BAG THEREIN
Filed Dec. 11, 1937   6 Sheets-Sheet 1

INVENTORS
Walter J. Breth
William C. McCoy
BY Evans + McCoy
ATTORNEYS

INVENTORS
Walter J. Breth
William C. McCoy
BY Evans + McCoy
ATTORNEYS

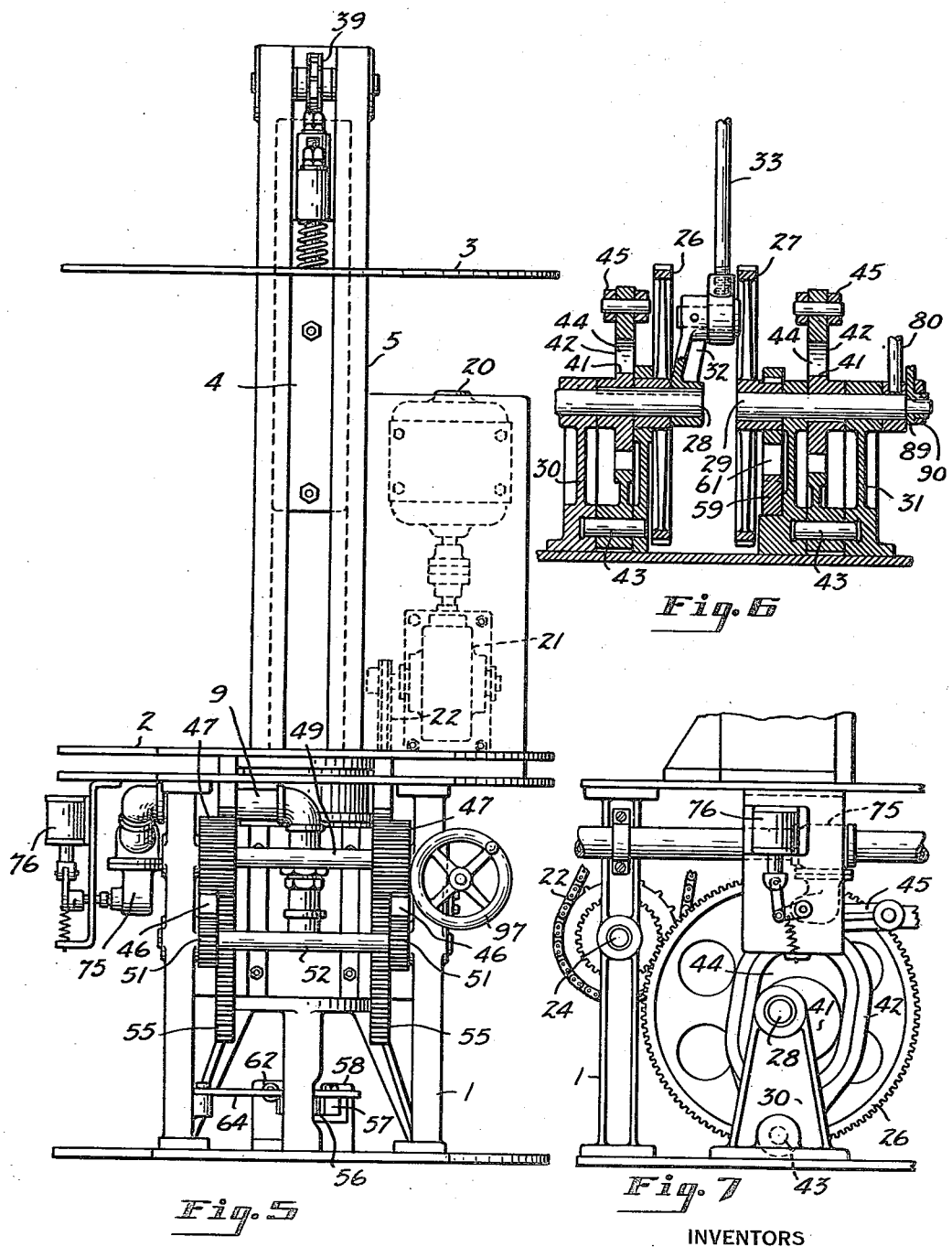

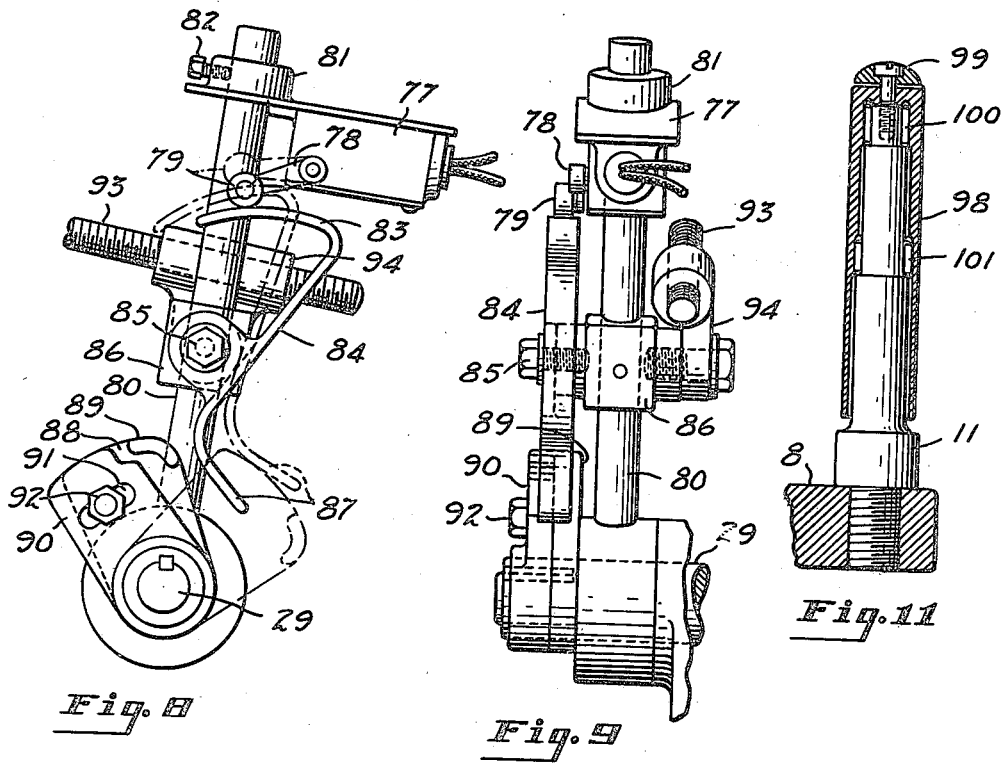
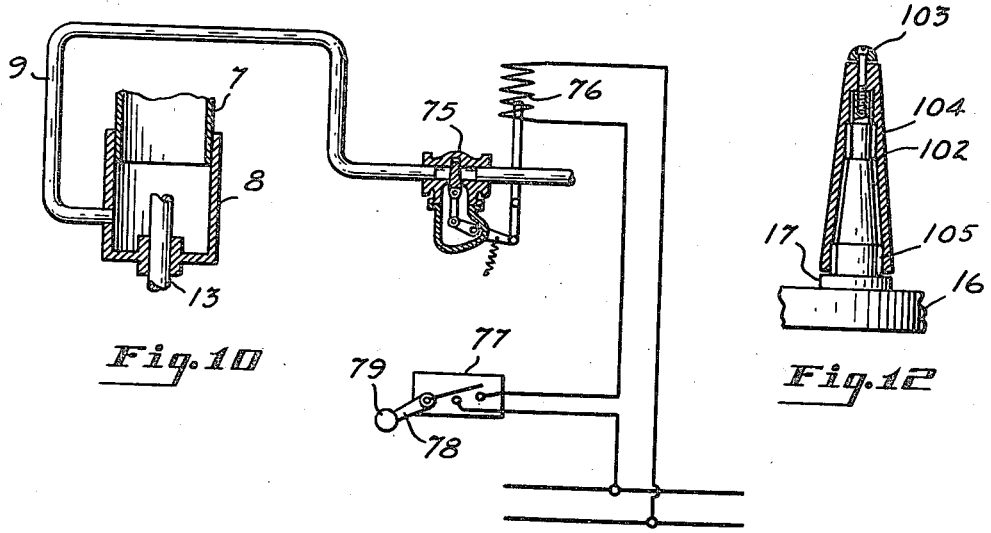

INVENTORS
Walter J. Breth
William C. McCoy
BY Evans & McCoy
ATTORNEYS

Patented Aug. 29, 1939

2,171,424

UNITED STATES PATENT OFFICE 2,171,424

APPARATUS FOR EXPANDING A TIRE CARCASS AND INSERTING AN AIR BAG THEREIN

Walter James Breth, Akron, and William C. McCoy, Shaker Heights, Ohio, assignors to The General Tire & Rubber Company, Akron, Ohio, a corporation of Ohio Application December 11, 1937, Serial No. 179,330

12 Claims. (Cl. 18—2)

This invention relates to a method of and apparatus for expanding a tire carcass and inserting an air bag therein, and has for its object to provide a simple and convenient method of and apparatus for preparing a tire carcass which has been built upon a drum for insertion into a tire mold by expansion of the central portion of the tire carcass to change the carcass from a nearly cylindrical form to a toroidal shape and by inserting an air bag into the expanded tire carcass.

A further object of the invention is to provide an improved method of introducing the air bag into the tire carcass during the process of expanding the tire carcass.

A further object is to provide a simple and relatively inexpensive machine for performing the process.

With the above and other objects in view the invention may be said to comprise the method and machine illustrated in the accompanying drawings hereinafter described and particularly set forth in the appended claims, together with such variations and modifications thereof as will be apparent to one skilled in the art to which the invention appertains. Reference should be had to the accompanying drawings forming a part of this specification in which Figure 1 is a side elevation of a tire carcass expanding and air bag inserting machine embodying the invention;

Fig. 5 is a front elevation of the machine;

Fig. 6 is a section taken on the line indicated at 6—6 in Fig. 1;

Fig. 7 is a fragmentary side elevation of the lower portion of the machine as viewed from the left hand side with reference to Fig 5;

Fig. 8 is a fragmentary side elevation showing the operating and timing mechanism for controlling the delivery of fluid under pressure to the interior of a tire carcass to expand the same;

Fig. 9 is a rear elevation of the mechanism shown in Fig. 8;

Fig. 10 is a diagrammatic view showing the solenoid controlled fluid pressure control valve;

Fig. 11 is a sectional view showing the air bag positioning pin;

Fig. 12 is a sectional view showing one of the air bag folding pins;

Fig. 13 is a plan view of the lower platen with the air bag in the position in which it is placed at the beginning of the operation;

Fig. 14 is a plan view showing the air bag folded and a tubular drum built carcass resting upon the platen with the air bag disposed interiorly thereof;

Fig. 15 is a side elevation of the assembly shown in Fig. 14;

Fig. 16 is a side elevation showing the upper platen engaging a tire carcass at the beginning of the expanding operation;

Fig. 17 is a side elevation showing the position of the parts at the end of the expanding operation, the platen, tire carcass, and air bag being broken away at one side and shown in radial section.

Figure 1:
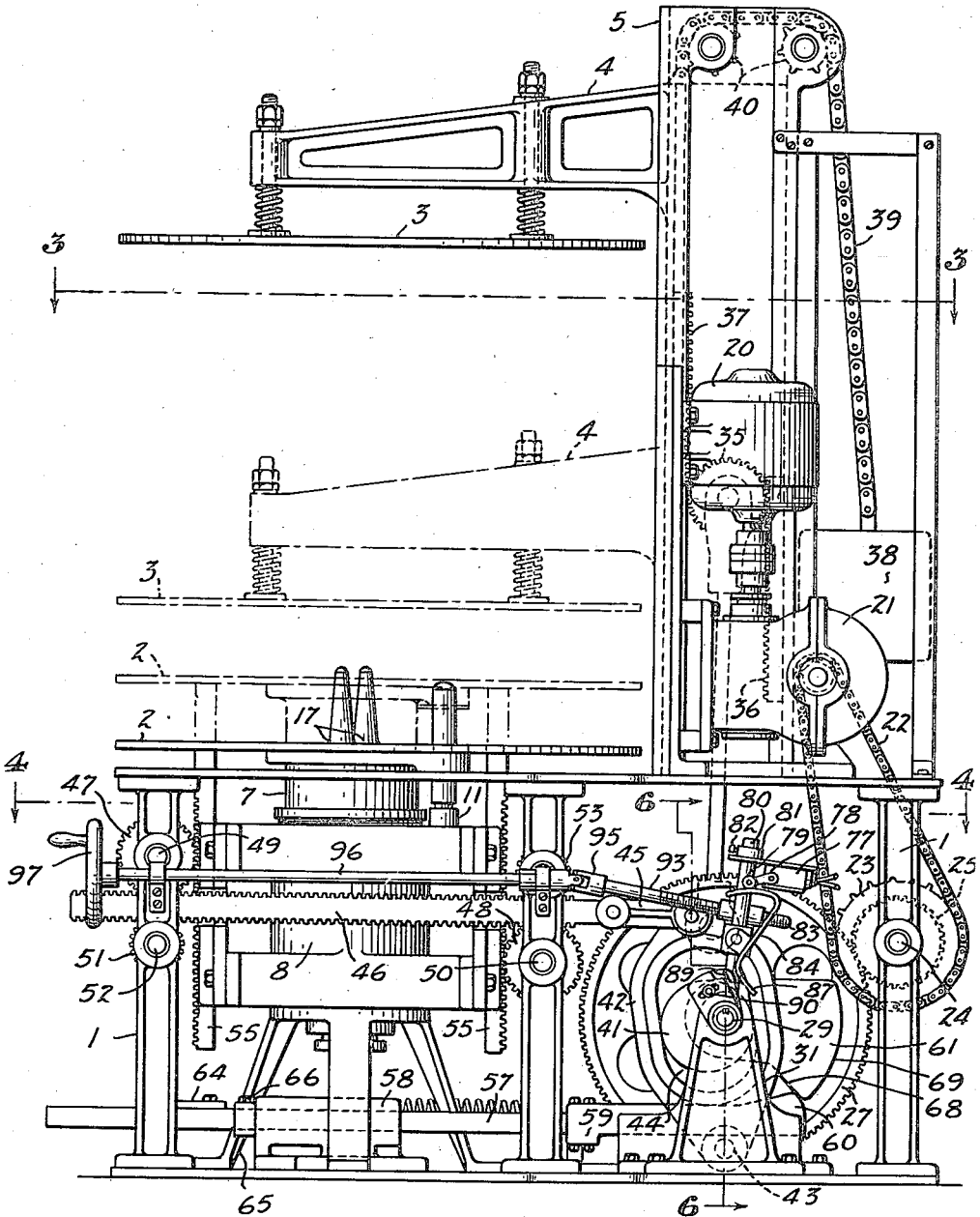
Figure 2:
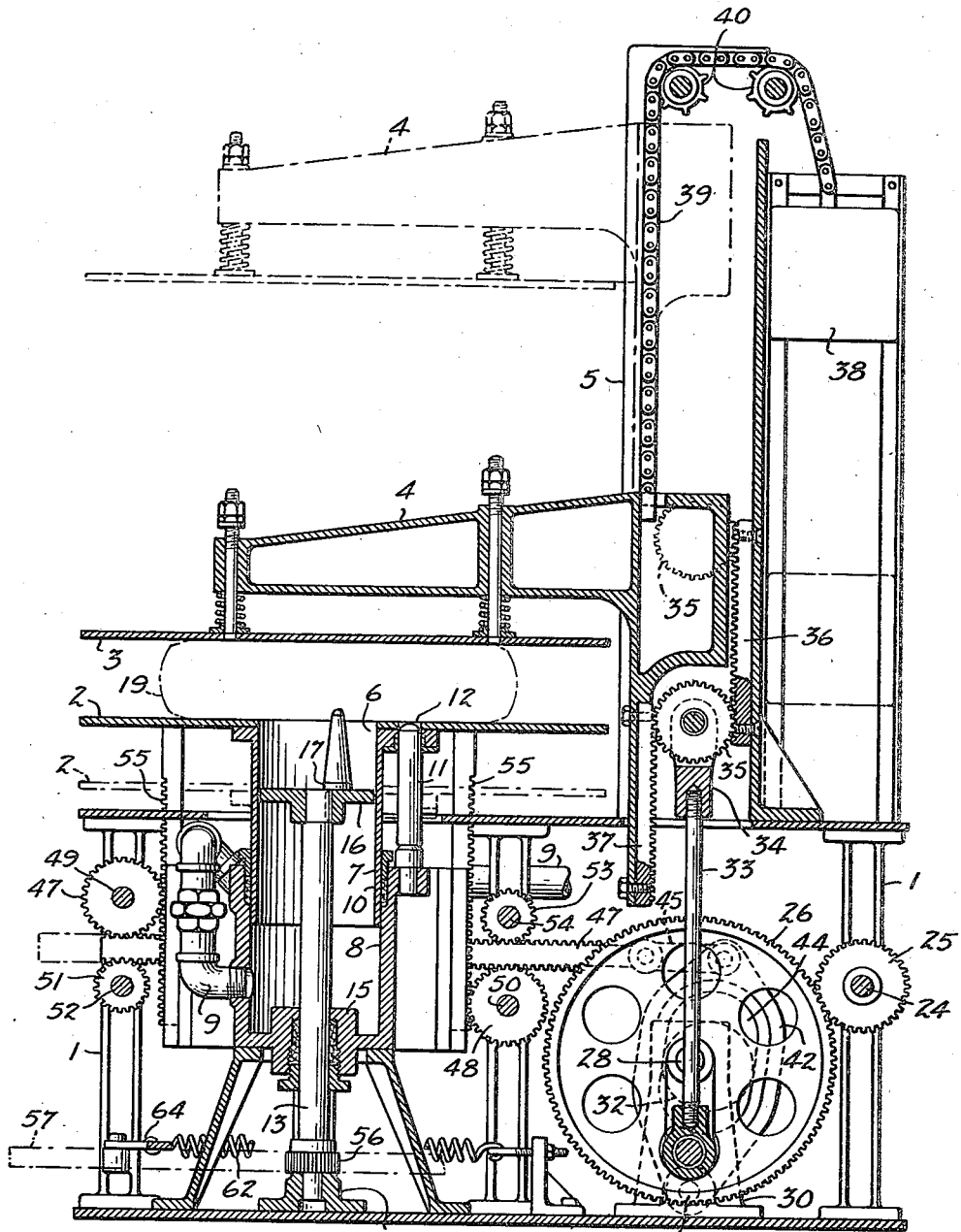
Fig. 2 is a central vertical section through the machine taken on the line indicated at 2—2 in Fig. 3.
Figure 3:
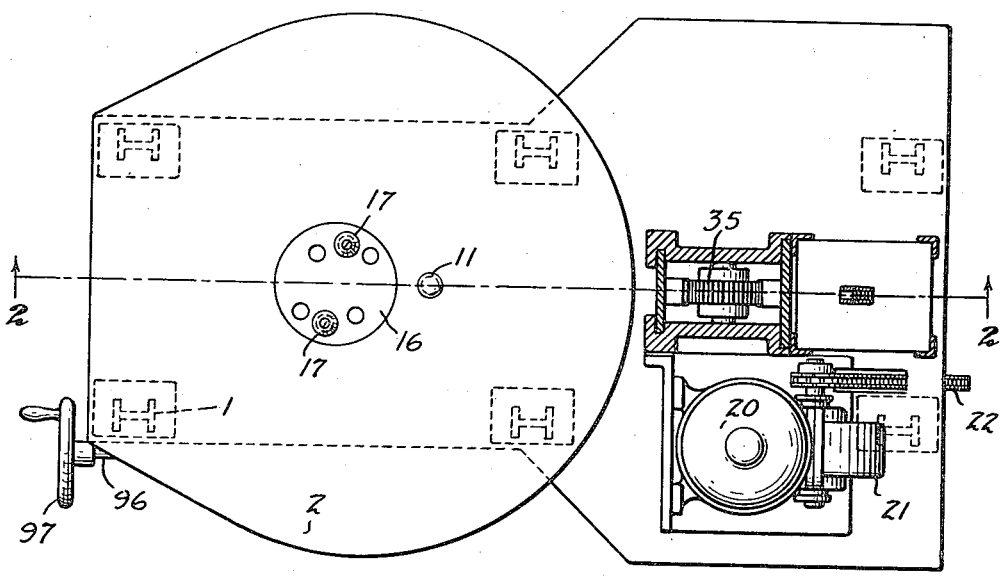
Fig. 3 is a horizontal section taken on the line indicated at 3—3 in Fig. 1.

In the accompanying drawings there is shown a machine for performing the method of the present invention. This machine is a press having a frame 1, a vertically movable lower platen 2 and a vertically movable upper platen 3. The upper platen 3 is supported by a carriage 4 which is mounted to travel vertically on a standard 5 forming a part of the machine frame. The lower platen 2 is provided with a central opening 6. At the under side of the platen there is attached a tube 7 which registers with the opening 6. The tube 7 has a sliding fit in a fixed cylinder 8 mounted in the frame 1. The cylinder 8 receives fluid under pressure through a pipe 9 so that when a tire carcass is clamped between the platens 2 and 3 fluid under pressure may be delivered to the interior of the tire carcass through the pipe 9, cylinder 8 and tube 7. To prevent escape of air or other fluid from the cylinder 8 a gland 10 is provided between the tube 7 and the upper end of the cylinder 8. A vertical pin 11 is mounted in the upper end of a fixed cylinder 8 and extends upwardly through an aperture 12 in the platen 2 which is located adjacent the central opening 6. A vertical shaft 13 journaled in a thrust bearing 14 at the base of the frame extends upwardly through the base of the cylinder 8 centrally thereof, escape of fluid around the shaft being prevented by a gland 15. The vertical shaft 13 turns about its axis and is held against vertical movement by the fixed thrust bearing 14. A disk 16 which is of a diameter somewhat less than the internal diameter of the tube 7 is fixed to the upper end of the shaft 13 and is disposed within the tube 7. The disk 16 carries two conical pins 17 located on diametrically opposite sides of the axis of the disk and at equal distances from the axis.

Figure 16:
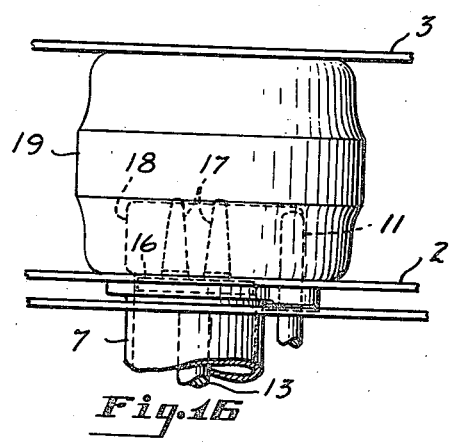
Figure 15:
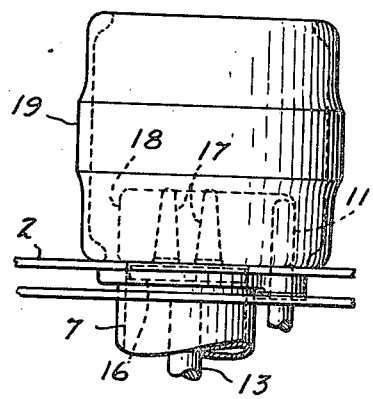

The platens 2 and 3 are movable from the full line positions shown in Fig.1 to the dotted line positions shown in the same figure. A substantially cylindrical tire carcass such as shown in Figs. 15 and 16 is placed on the lower platen 2 while the lower platen is in the position shown in Fig. 1. Air or other fluid under pressure is admitted through the cylinder 8 and tube 7 to the interior of the tire carcass while the platens are moving from the position shown in Fig. 16 to the position shown in Fig. 17 to radially expand the central portion of the tire carcass while the tire carcass is being compressed between the platens, so that the tire carcass is changed from a substantially cylindrical shape to the toroidal shape shown in Fig. 17.

Figure 13:
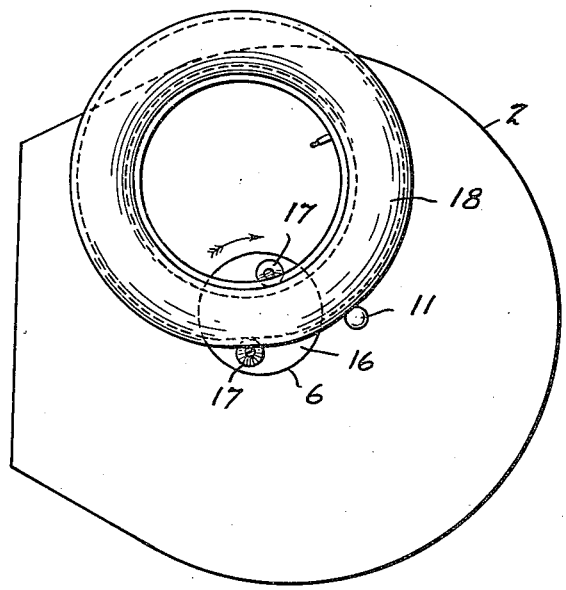
Figs. 13 to 17 show the cycle of operations performed on the air bag and tire carcass in expanding the carcass and inserting an air bag therein.
Figure 17:
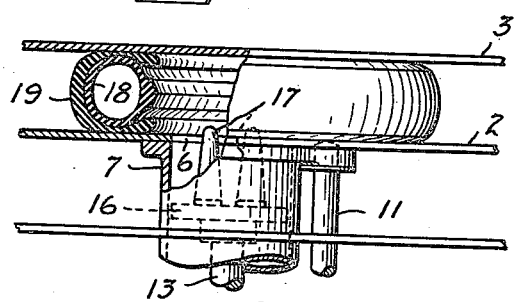

One of the main features of the present invention is the provision of a simple means for and method of inserting an air bag into the tire carcass during the expanding operation so that after the expanding operation is completed the tire carcass may be transferred directly from the presses to a vulcanizing mold. As shown in Fig. 1 the lower platen 2 has a short vertical stroke while the upper platen 3 has a relatively long stroke so that the two platens which are reciprocated simultaneously are widely separated throughout a considerable portion of the reciprocating strokes of the platens and the tire carcass is compressed during a final portion of the pressure stroke. When the platen 2 is in its lowermost position the disk 16 is positioned within the opening 6 substantially flush with the top of the platen, the pins 11 and 17 projecting above the top face of the platen 2 as shown in Figs. 13, 15 and 16. An air bag 18 is placed upon the platen 2 with the interior periphery thereof in engagement with one of the pins 17 and the exterior periphery in engagement with the other pin 17 and with the stationary pin 11, as shown in Fig. 13. After the air bag is so placed the shaft 13 is given one complete revolution, causing the pin 17 which engages the interior periphery of the air bag to pass between pin 11 and the other pin 17 and upon continued rotational movement to flatten the air bag against pin 11 and to fold the flattened air bag around the other pin 17. After one complete revolution the air bag is folded to the shape shown in Fig. 14 so that it lies within a circle of less size than a bead opening of the tire carcass and a tire carcass 19 can be placed upon the platen 2 as shown in Fig. 15 with the air bag 18 within the tire carcass 19. After the tire carcass and air bag are assembled as shown in Fig. 15 the upper platen 3 is brought into engagement with the top of the tire carcass and the platens 2 and 3 moved toward each other to compress the tire carcass. During the compression of the tire carcass, air or other fluid under pressure is admitted through the cylinder 8 and tube 7 to the interior of the tire carcass, causing the central portion of the tire carcass to expand radially. As the platen 2 approaches the upper end of its stroke it strips the air bag 18 from the holding pins 11 and 17, whereupon the elastic air bag springs out to its normal shape within the tire carcass as shown in Fig. 17. The shaft 13 is held against rotative movement after the initial rotation, so that the pins 11 and 17 hold the air bag in folded position until stripped off the pins by the upward movement of the platen 2.

The platens 2 and 3 are preferably reciprocated continuously with a motion such that sufficient time is permitted the operator to remove an expanded tire carcass from the lower platen 2 and to place an air bag and a tire carcass thereon while the platens are widely separated. The upper platen preferably is provided with a slow movement during the end of the compression stroke and the stroke of the lower platen is so timed with respect to the stroke of the upper platen that the major portion of its movement occurs while the upper platen is near its lowermost position. Means is also provided for automatically controlling the flow of fluid under pressure to the interior of the tire carcass for imparting the necessary movement to the air bag folding pins at the proper time during the cycle of operation.

Figure 4:
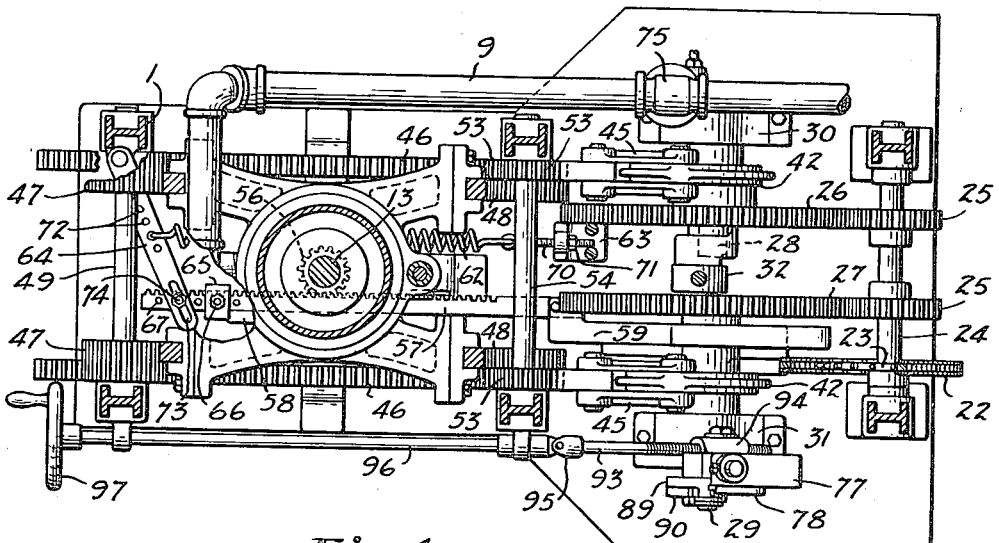
Fig. 4 is a horizontal section taken on the line indicated at 4—4 in Fig. 1.

The machine is driven by an electric motor 20 which is connected through reduction gearing in a casing 21 to a drive chain 22 which drives a sprocket 23 which is secured to a countershaft 24 journalled in the frame 1. Two identical gears 25 are fixed to the shaft 24 and these gears mesh with two identical large gears 26 and 27 which are fixed to adjacent inner end portions of two axially aligned shafts 28 and 29 which are journaled in laterally spaced brackets 30 and 31 as shown in Figs. 4 and 6. The shaft 29 is provided with a crank arm 32 at its inner end between the gears 26 and 27. To this crank arm is attached a pitman 33 which extends vertically and has a head 34 at its upper end carrying a pinion 35 which meshes with a rack 36 on the standard 5 and with a rack 37 on the carriage 4. The pinion 35 rolling on the stationary rack 36 imparts a vertical movement to the carriage 4 at a speed twice that of the vertically moving head 34, imparting to the carriage 4 and platen 3 a stroke of twice the length of that of the pitman 33. The weight of the carriage 4 and platen 3 is balanced by a counterweight 38 slidable along the rear of the standard 5 and connected to the carriage 4 by a chain 39 which runs over idler sprockets 40 at the upper end of the standard 5. By reason of the crank motion vertical movement of the platen 3 is slow at the upper and lower ends of its stroke and is relatively rapid intermediate the ends of the stroke.

The lower platen 2 is also actuated by the shafts 28 and 29 to impart a vertical stroke thereto, which is properly timed with respect to the stroke of the upper platen 3. The shafts 28 and 29 have identical eccentric cams 41 identically positioned thereon which actuate levers 42 pivoted at their lower ends on pins 43 disposed horizontally in the brackets 30 and 31 directly beneath the shafts 28 and 29. The levers 42 are each provided with a slot 44 which receives one of the cams 41, the slot being of a width substantially equal to the diameter of the cam and a length somewhat greater than the diameter of the cam so that each lever is oscillated through a small arc by its cam during the revolution of the shafts 28 and 29. The upper ends of the levers 42 are connected by links 45 to horizontal rack bars 46, the levers 42, links 45, and rack bars 46 being of identical construction, so that the two rack bars are moved in unison. The rack bars 46 are provided with rack teeth along both their upper and lower edges. The upper rack teeth are in engagement with a pair of wide pinions 47 adjacent the front of the machine and the lower rack teeth engage with a pair of wide pinions 48 adjacent the rear end of the rack bar. The pinions 47 are mounted on a cross shaft 49 and the pinions 48 are mounted on a cross shaft 50. A pair of idler pinions 51 on a cross shaft 52 engage the under side of the rack bar 46 opposite the pinions 47 and a pair of idler pinions 53 on a cross shaft 54 to engage the rack bar 46 opposite the pinions 48. The two pairs of oppositely disposed pinions engaging each rack bar 46 positively hold the rack bars to straight line movement. Each of the two wide pinions 47 and each of the two wide pinions 48 meshes with a vertical rack bar 55 fixed to the platen 2. Through pinions 47 and 48 and rack bars 55 a vertical movement is imparted to platen 2 equal in speed to the speed of horizontal movement of the rack bars 46. By reason of the fact that the levers 42 are oscillated through a relatively small angle the length of the stroke imparted to the platen 2 is relatively short. A complete reciprocating stroke is imparted to each of the platens upon each revolution of the shafts 27 and 28.

The two platens reach the end of their stroke at the same time and the eccentrically mounted cams 41 move the platen 2 with increased rapidity near the ends of its stroke, whereas the crank 32 moves the platen 3 slowly near the end of its stroke. During the portion of the operating cycle in which a tire carcass is compressed between the platens, the movement of the platen 2 is considerably greater than the movement of the platen 3, the movement of the platen 2 being sufficient to raise the platen to near the upper ends of the pins 11 and 17 and strip the air bag from the holding pins 11 and 17.

A rotation is imparted to the shaft 13 while the platen 2 is near its lowermost position by means of mechanism operated by the shaft 28. The shaft 13 has a pinion 56 fixed thereto near its lower end which engages with a horizontal rack bar 57 which has its forward end slidable in a guide bracket 58 and which has a rear offset portion 59 slidable in bracket 31. The offset rear end portion 59 of the rack 57 is provided with an enlarged rear end portion 60 which is engaged by a cam 61 on the shaft 29. The rack bar 57 is normally held in its rearmost position by means of a coil spring 62 anchored at its rear end to a fixed bracket 63 and connected at its forward end to a lever 64 which is pivoted at one end to the frame and at its opposite end to the forward end of the rack bar 57. The rearmost position of the rack bar 57 is determined by a stop 65 on the rack bar which engages the forward end of the guide bracket 58. The stop 65 is adjustable on the rack bar, being held in place by a bolt 66 which may be placed in any one of a number of holes 67 spaced longitudinally of the bar 57. The cam 61 has a flat face 68 which engages with the enlarged end 60 of the rack bar 57 to move the rack bar and an arcuate peripheral face 69 which engages the enlarged end 60 to hold the rack bar in its forward position. During rotation of the cam 61 the face 68 of the cam engages the enlarged end 60 of the rack bar and moves the rack bar forwardly until the upper edge of the enlargement 60 rides off the radial face 68 onto the arcuate peripheral face 69 of the cam. Engagement of the arcuate face 69 of the cam with the upper edge of the enlargement 60 holds the rack bar in its forward position and prevents rearward movement of the rack bar until the arcuate portion 69 has passed the enlargement 60 whereupon the spring 62 returns the rack bar to its original position. The cam 61 is so positioned on the shaft 29 as to move the rack bar 57 forwardly and impart a rotation to the shaft 13 while the platens 2 and 3 are near their most widely separated position. The length of the arcuate portion 69 of the cam 61 is such as to retain the shaft 13 and the air bag folding pins 17 carried thereby in the position to which they have been moved by the flat portion 68 of the cam at the beginning of the compression stroke.

The rear end of the spring 62 is connected to the bracket 63 by means of a screw 70 and nut 71 which may be adjusted to vary the tension of the spring. The lever 64 is adjustably connected both to the spring and to the rack bar 57 so that by adjustment of the lever or the connection of the spring to the lever an additional adjustment of spring tension may be obtained. The lever 64 is provided with longitudinally spaced holes 72 in which the forward end of the spring 62 may be hooked. The end of the lever connected to the rack bar 57 is provided with a longitudinal slot 73 which receives a bolt 74 which may be placed in a selected one of the longitudinally spaced holes 67 in the rack bar. By adjusting the connection of the lever to the rack bar toward the forward end of the rack bar the tension of the spring may be increased and by adjusting the connections of springs 62 outwardly along the lever 64 the leverage on the rack bar may be increased.

Means is provided for automatically admitting fluid pressure through the pipe 9, cylinder 8, and tube 7 to the interior of a tire carcass during the portion of the stroke of the platens in which the tire carcass is subjected to pressure between the platens 2 and 3. The pipe 9 is provided with a valve 75 which is opened and closed by means of a solenoid 76 as shown in Fig. 10. The operation of the solenoid 76 is controlled by a switch 77 provided with a lever 78 which is actuated to hold the switch closed during a portion of the revolution of the shaft 29, the lever 78 being provided with a roller 79 for engagement with a suitable intermittently operated actuating member. At the outer side of the bracket 31 there is mounted an upright rod 80 which is pivoted at its lower end on the shaft 29. The switch 77 is supported on the upper end of the rod 80 by means of a collar 81 which is attached to the rod 80 by a set screw 82 so that the switch may be adjusted vertically on the rod. The roller 79 of the switch lever engages with a curved cam face 83 on a trip lever 84 which is connected by a pivot 85 to a bracket 86 fixed to the rod 80 intermediate the ends of the rod. The lever 84 has a reversely bent lower end 87 which engages a trip arm 88 fixed to the outer end of the shaft 29. The trip arm 88 has an arcuate end face 89 upon which the lower end portion 87 of the lever 84 rides during a portion of the revolution of the shaft to hold the switch lever 78 in closed position. The length of the arcuate end face 89 determines the period of time during which the switch is held in closed position and the valve 75 is held open. In order to vary the period during which pressure is supplied to the interior of the tire carcass the trip arm 88 has an angularly adjustable member 90 which is pivoted on the shaft 29 and which has an arcuate end face of the same diameter as the arcuate face 89 of the arm 88. The adjustable member 90 is provided with an arcuate slot 91 and is attached to the part 29 by means of the bolt 92 passing through the slot. The bolt 92 clamps the member 90 in adjusted position and by adjusting the member 90 angularly the extent of the arcuate cam face may be varied to vary th period of time during which the switch 77 is held closed.

Means is also provided for varying the time of actuation of the switch, this being accomplished by adjusting the rod 80 angularly, thereby varying the time of actuation of the switch with respect to the cycle of operation. The rod 80 is adjusted and held in its various positions of adjustment by means of the screw 93 which engages a nut 94 swiveled to the bracket 86. The screw 93 is connected by a universal joint 95 to a shaft 96 journaled in the frame. The shaft 94 is provided with a hand wheel 97 at its forward end by means of which it may be turned to adjust the rod 80.

As shown in Figs. 11 and 12 of the drawings, the air bag engaging pins 11 and 17 preferably have freely rotatable air bag engaging portions so as to reduce the friction between the pins and the air bag during the folding operation. As shown in Fig. 11 the pin 11 is provided with a rotatable bag engaging sleeve 98 which fits over the top of the pin and which is held in place by a bolt 99 which passes through the closed upper end of the sleeve into the upper end of the pin 11. The sleeve 98 is rotatable upon the bolt 99 and roller bearings 101 are provided between the sleeve 98 and the pin 11. As shown in Fig. 12 the pins 17 carried by the rotatable pins 16 are provided with a tapered sleeve 102 held in place by a bolt 103 and provided with roller bearings 104 and 105 between and interior of the sleeve and the exterior of the nonrotatable body of the pin.

During the operation of the machine the axially aligned shafts 28 and 29 are continuously driven in the same direction and at the same speed by the motor 20 and the upper platen 3 is continuously reciprocated by the shaft 28 through the crank 32, pitman 33, pinion 35, and rocks 36 and 37, the platen 3 having a long stroke so that it is in its uppermost position so that there is ample clearance between the platen to permit the placing of the air bag and the tire carcass upon the lower platen 2. The lower platen 2 is simultaneously reciprocated with a relatively short stroke by the shafts 28 and 29 through the eccentrics 41, levers 42 and rack bars 46, the actuating eccentrics and levers being so arranged that the rapid portion of the stroke of the lower platen takes place during a portion of the stroke of the upper platen when the upper platen is traveling slowly so that, while the upper platen is near the lower end of its stroke the lower platen 2 has sufficient upward movement to effect the desired compression of the tire carcass against the upper platen. In order to prevent the exertion of excessive pressure on a tire carcass the upper platen 3 may be backed by springs 106. During the interval in which the lower platen 2 is at the lower end of its stroke and the upper platen 3 is at the upper end of its stroke, a rotation is imparted to the shaft 13 by means of the rack bar 67 which is actuated in a forward direction by the cam 61 and held against movement in a forward position during the compression stroke by the arcuate face 69 of cam 61.

Figure 14:
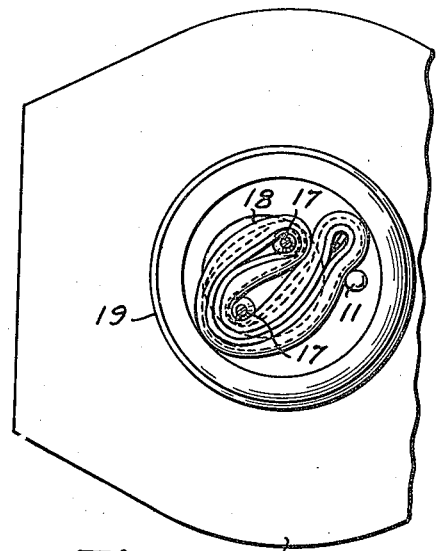

After the completion of an air bag expanding operation the operator removes an expanded tire carcass while the platens 2 and 3 are being retracted. He then places an uninflated air bag on the lower platen, placing the bag in engagement with the pins 11 and 17 as shown in Fig. 13. After actuation of the shaft 13 to fold the air bag, the tire carcass is placed on the lower platen 2 as shown in Figs. 14 and 15. The upper platen then moves down into engagement with the upper end of the tire carcass and the valve 75 is actuated by means of the trip arm 83 on the shaft 29 and trip lever 84 to expand the tire carcass. The length of time during which it is desirable to supply air to the tire carcass may vary with tire carcasses of different sizes and it may be desirable to vary the timing of the application of fluid pressure with respect to the timing of the reciprocating stroke of the platens. The adjustment of the member 90 of the trip arm serves to vary the length of time during which the valve 75 is held open and the adjustment of the pivoted switch supporting rod 80 varies the time of the valve operation.

It is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A tire carcass expanding machine comprising upper and lower press platens adapted to receive a tire carcass between them, the lower platen having a central opening, a vertical tube registering with said opening and attached to the under side of said platen, air bag confining members supported independently of the lower platen and extending through the lower platen for confining an air bag on said platen within a circle smaller than a bead opening of the tire carcass, means for introducing fluid under pressure to the interior of the tire carcass through said tube, and means for raising the lower platen to compress the tire carcass and to simultaneously lift the air bag out of engagement with said confining members.

2. An air bag folding device comprising an air bag support a rotatable member having an end face with pins projecting therefrom which are parallel with the axis of rotation and disposed on opposite sides thereof, said pins being engageable with an air bag annulus on said support with the interior periphery of the annulus in engagement with one pin and the exterior periphery thereof in engagement with the other pin, a pin supported independently of said rotatable member and parallel with the pins on the rotatable member and disposed for engagement with the exterior periphery of the air bag close to but outside the circle of travel of said pins on the rotatable member, means for turning said rotary member in a direction to first move the pin engaging the interior of the air bag between the other two pins, and means for causing a relative movement of the support with respect to the pins to release the air bag from the pins.

3. An air bag folding device comprising an air bag support, a rotatable member having an end face with pins projecting therefrom which are parallel with the axis of rotation and disposed on opposite sides thereof, said pins being engageable with an air bag annulus on said support with the interior periphery of the annulus in engagement with one pin and the exterior periphery thereof in engagement with the other pin, a pin supported independently of said rotatable member and parallel with the pins on the rotatable member and disposed for engagement with the exterior periphery of the air bag close to but outside the circle of travel of said pins on the rotatable member, means for turning said rotary member in a direction to first move the pin engaging the interior of the air bag between the other two pins, each of said pins having a freely rotatable bag engaging portion, and means for causing a relative movement of the support with respect to the pins to release the air bag from the pins.

4. A tire carcass expanding machine comprising a frame, a lower carcass receiving platen mounted for vertical movement in the frame, said platen having a central opening, a fluid pressure conduit communicating with said opening, a valve controlling the flow of fluid through said conduit, an upper platen mounted for vertical movement in the frame, continuously operating means for imparting long reciprocating strokes to the upper platen and relatively short reciprocating strokes to the lower platen and for timing the strokes of the platens so that the major portion of the upward movement of the lower platen occurs while the upper platen is near its lowermost position, and means controlled by said operating means for actuating said valve to admit fluid under pressure to the interior of a tire carcass compressed between the platens during a predetermined portion of the compression stroke.

5. A tire carcass expanding machine comprising a frame, upper and lower carcass receiving platens adapted to receive a tire carcass between them, one of said platens having a central opening, a fluid pressure conduit communicating with said opening, a valve controlling the flow of fluid through said conduit, platen supporting members mounted for vertical movement in the frame, cushioning means interposed between one of said members and its platen to limit the pressure applied to a tire carcass, means for reciprocating said members to compress a tire carcass between the platens, means controlled by the platen operating means for operating said valve to supply pressure to the interior of a tire carcass during a predetermined portion of the compression stroke, and means for adjusting said valve operating means to vary the duration of the application of fluid pressure to the tire carcass.

6. A tire carcass expanding machine comprising a frame, a lower carcass receiving platen mounted for vertical movement in the frame, said platen having a central opening, a fluid pressure conduit communicating with said opening, a valve controlling the flow of fluid through said conduit, an upper platen mounted for vertical movement in the frame, means for reciprocating said platens to compress a tire carcass between them, means for actuating said valve to admit fluid under pressure to the interior of a tire carcass, controlling means for said valve actuating means comprising an actuating member operated by the platen operating means and a trip member intermittently engaged by said actuating member, and means for adjusting one of said members to vary the duration of the application of fluid pressure to the tire carcass.

7. A tire carcass expanding machine comprising a frame, upper and lower carcass receiving platens adapted to receive a tire carcass between them, one of said platens having a central opening, a fluid pressure conduit communicating with said opening, a valve controlling the flow of fluid through said conduit, platen supporting members mounted for vertical movement in the frame, means for reciprocating said members to compress a tire carcass between the platens, cushioning means interposed between one of said members and its platen to limit the pressure applied to a tire carcass, means for actuating said valve to admit fluid under pressure to the interior of a tire carcass, controlling means for said valve actuating means comprising an actuating member operated by the platen operating means and a trip member intermittently engaged by said actuating member, and means for adjusting one of said members to vary the timing of the application of fluid pressure with respect to the compression stroke, and means for adjusting the other of said members to vary the timing of the application of fluid pressure with respect to the compression stroke.

8. A tire carcass expanding machine comprising a frame, a lower carcass receiving platen mounted for vertical movement in the frame, said platen having a central opening, a fluid pressure conduit communicating with said opening, a valve controlling the flow of fluid through said conduit, an upper platen mounted for vertical movement in the frame, means for reciprocating said platens to compress a tire carcass between them, means for actuating said valve to admit fluid under pressure to the interior of a tire carcass, controlling means for said valve actuating means comprising an actuating member operated by the platen operating means and a trip member intermittently engaged by said actuating member, means for adjusting one of said members to vary the duration of the application of fluid pressure, and means for adjusting the other of said members to vary the timing of the application of fluid pressure with respect to the compression stroke.

9. A tire carcass expanding machine comprising a frame, a lower carcass receiving and air bag supporting platen mounted for vertical movement in the frame, said platen having a central opening, a fluid pressure conduit communicating with said opening, a valve controlling the flow of fluid through said conduit, an upper platen mounted for vertical movement in the frame, continuously operating means for imparting long reciprocating strokes to the upper platen and relatively short reciprocating strokes to the lower platen and for timing the strokes of the platens so that the major portion of the upward movement of the lower platen occurs while the upper platen is near its lowermost position, means for folding an air bag supported on said lower platen, and means for actuating said folding means while the lower platen is near the lower end of its stroke and for releasing said air bag during upward movement of said lower platen.

10. A tire carcass expanding machine comprising a frame, upper and lower platens adapted to receive a tire carcass between them, the lower of said platens having openings, spaced air bag engaging pins supported independently of said platen and projecting through said openings, means for moving certain of said pins laterally with respect to others to fold an air bag resting on the lower platen and for holding said pins against movement to retain the folded air bag, means for moving said lower platen upwardly to press a tire carcass thereon against the upper platen and to strip the air bag from said pins, and means for admitting fluid under pressure through a platen to the interior of a tire carcass pressed between the platens while the tire carcass is compressed between the platens.

11. A tire carcass expanding machine comprising a frame, upper and lower platens, the lower or said platens providing a support for a tire carcass and an air bag, said lower platen having a central opening and an aperture adjacent one side of the central opening, a vertical shaft journalled in the frame beneath said central opening, a disk carried by the upper end of said shaft, two air bag engaging pins projecting upwardly from the disk on opposite sides of the axis thereof and projecting through said central opening, an air bag engaging pin projecting upwardly through said aperture, means for turning said shaft to fold an air bag supported on the lower platen and engaged by said pins, and means for elevating said lower platen to compress the tire carcass against said upper platen and to strip the air bag from said pins.

12. A tire carcass expanding machine comprising a frame, upper and lower platens, the lower of said platens providing a support for a tire carcass and an air bag, said lower platen having a central opening and an aperture adjacent one side of the central opening, a cylinder having an open upper end mounted in the frame beneath said central opening, a tube secured at one end to the platen around the central opening and having a sliding fit in the cylinder, an air bag engaging pin projecting upwardly through said aperture, a vertical shaft extending upwardly through the bottom of said cylinder, a disk carried by the shaft at its upper end, two air bag engaging pins mounted on said disk at opposite sides of its axis and projecting through said central opening, means for turning said shaft to fold an air bag supported on the platen and engaged by said pins, means for elevating said lower platen to compress a tire carcass against the upper platen and to strip the air bag from said pins, and means controlled by the actuating means for admitting fluid under pressure through said cylinder to the interior of a tire carcass compressed between said platens.

WALTER JAMES BRETH.
WILLIAM C. McCOY.